United States Patent
Guasch et al.

[11] Patent Number: 5,241,893
[45] Date of Patent: Sep. 7, 1993

[54] REACTION SYSTEM FOR A ROTARY HYDRAULIC DISTRIBUTOR

[75] Inventors: Esteve C. Guasch; Juan S. Bacardit, both of Barcelona, Spain

[73] Assignee: Bendix Espana, Barcelona, Spain

[21] Appl. No.: 868,815

[22] Filed: Apr. 15, 1992

[30] Foreign Application Priority Data

Apr. 19, 1991 [ES] Spain ................................ 91-00997

[51] Int. Cl.[5] .................................................. F15B 9/10
[52] U.S. Cl. ............................. 91/375 R; 91/375 A; 91/434; 150/141
[58] Field of Search ............... 91/370, 371, 374, 375 R, 91/375 A, 38 Z, 434; 180/141, 143

[56] References Cited

U.S. PATENT DOCUMENTS

| | | | |
|---|---|---|---|
| 3,998,131 | 12/1976 | Adams | 91/375 A X |
| 4,057,079 | 11/1977 | Taig | 91/375 R X |
| 4,582,086 | 4/1986 | Bacardit | 91/375 A X |
| 4,593,718 | 6/1986 | Lang et al. | 91/375 A X |
| 4,730,687 | 3/1988 | Chikuma et al. | 91/375 A X |
| 4,739,693 | 4/1988 | Honaga et al. | 91/370 |
| 5,147,009 | 9/1992 | Chikuma et al. | 91/434 X |

FOREIGN PATENT DOCUMENTS

0123619 10/1984 Fed. Rep. of Germany ... 91/375 A

Primary Examiner—Edward K. Look
Assistant Examiner—Hoang Nguyen
Attorney, Agent, or Firm—Larry J. Palguta; Ken C. Decker

[57] ABSTRACT

The invention relates to a rotary hydraulic distributor comprising a primary rotary element (3) coupled to an actuating device and connected for rotation with a valve rotor, a secondary rotary element (5) coupled to a driven device and connected for rotation with a valve stator, the valve stator and the valve rotor mutually cooperating to control a double acting servomotor of the driven device, a limited relative angular displacement being permitted between primary and secondary elements (3, 5) on either side from a central rest position, and a reaction mechanism being provided in order to bias the primary element (3) toward the central rest position. According to the invention, the reaction mechanism consists of a pair of independent substantially U-shaped pistons (7) able to tilt within respectively one bore (12) of a pair of bores symmetrically provided in secondary element (5), the legs (15) of U-shaped pistons (7) engaging and biasing opposite radial ends (4) of primary rotary element (3).

3 Claims, 4 Drawing Sheets

REACTION SYSTEM FOR A ROTARY HYDRAULIC DISTRIBUTOR

The present invention relates to a rotary hydraulic distributor comprising a primary rotary element coupled to an actuating device and connected for rotation with a valve rotor, a secondary rotary element coupled to a driven device and connected for rotation with a valve stator, the valve stator and the valve rotor mutually cooperating to control a double acting servomotor of the driven device, a limited relative angular displacement being permitted between the primary and secondary elements on either side from a central rest position, reaction means being provided in order to bias the primary element towards the central rest position.

Such a rotary hydraulic distributor is particularly useful for power steering system in use in vehicles for providing a steering assistance.

EP-A-O 123 619 discloses such a rotary hydraulic distributor. The reaction means of same is comprised of two substantially semi-circular and symmetric portions intercalated by their adjacent end areas in sealing interrelationship and resiliently biased towards each other for forming a deformable ring by diametrically opposite springs. These reaction means are difficult and expensive to machine.

The object of this invention is to provide a low-cost distributor having enhanced reaction means.

According to this invention, the reaction means consists of a pair of independent substantially U-Shaped pistons able to tilt within respectively one bore of a pair of bores symmetrically provided in the secondary element, the legs of the U-Shaped pistons engaging and biasing opposite radial ends of the primary rotary element.

Preferingly, a hydraulic pressure is tightly applied to the base of the U-Shaped pistons to bias the radial ends.

This invention will be better understood by reading the following description of preferred embodiments with reference to the drawings in which:

FIG. 5 shows diagrammatically in an axial cross-section the valve rotor according to FIGS. 4 and 6.

Figure 1:
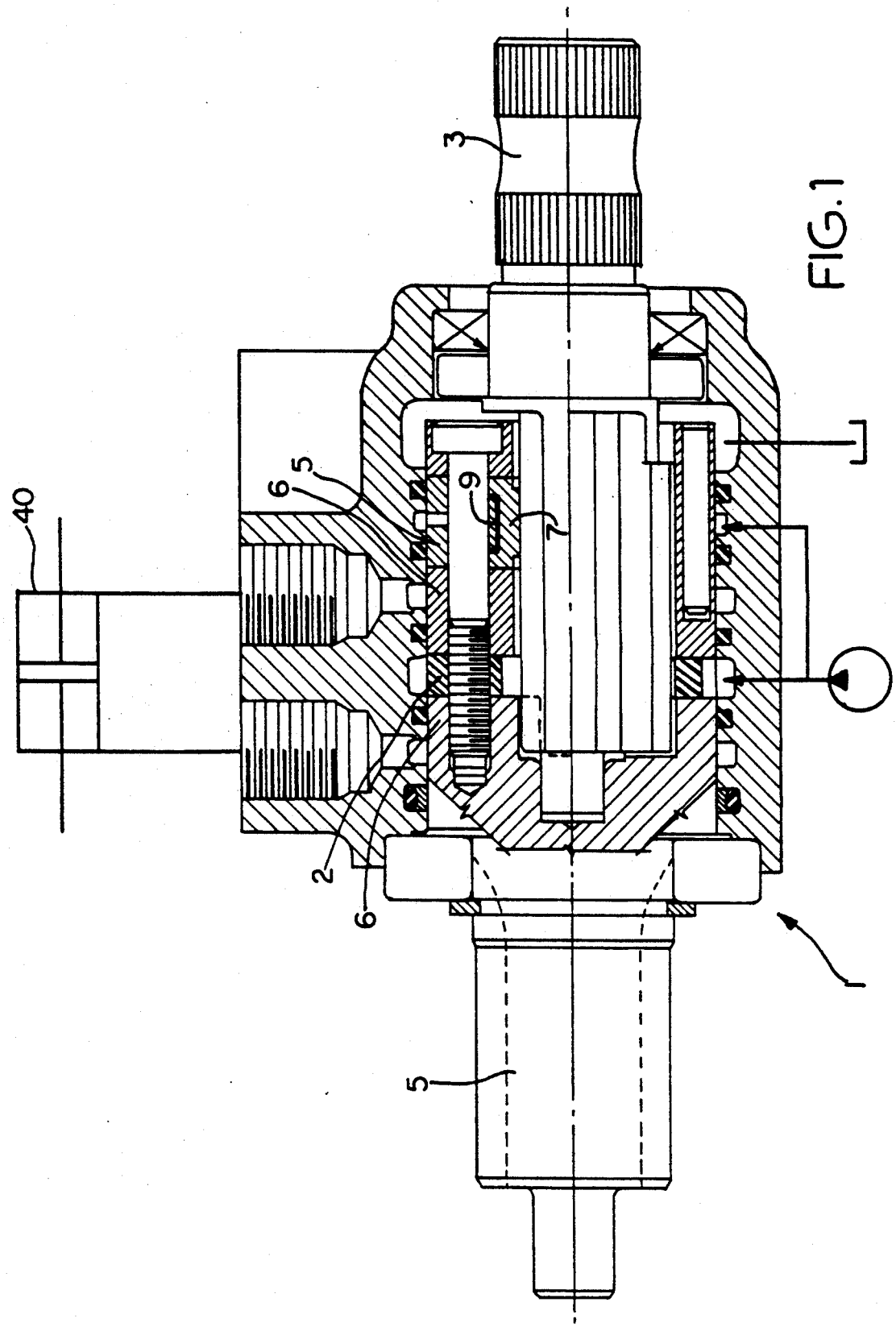
FIGS. 1 and 2 show diagrammatically in axial and radial cross-section reaction means according to one embodiment of the invention.

A rotary hydraulic distributor 1 is illustrated in FIG. 1.

Figure 2:
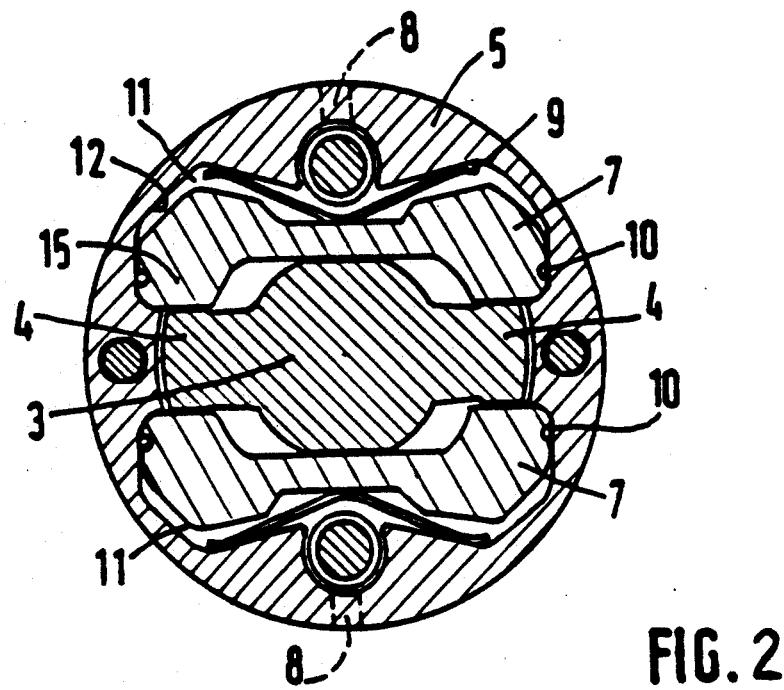

With reference now to the FIG. 2, the rotary hydraulic distributor has not been completely represented since the general structure of such a distributor is well-known by the skilled man.

The input shaft, i.e. controlled by the steering wheel, presents two opposite radial ends 4, and constitutes the primary rotary element 3 of the distributor (see FIGS. 1 and 2).

The secondary rotary element 5 is coupled with the driven device.

The primary rotary element 3 is connected for rotation with a valve rotor 2, while the secondary rotary element 5 is connected for rotation with a valve stator 6.

A limited relative angular displacement is permitted between these elements 3, 5, and thus, between the stator valve and the rotor valve in order to control a double acting servo motor 40 in a well-known manner.

The reaction means consists of a pair of substantially U-Shaped pistons 7 symmetrically and respectively located in a bore 12 provided in the secondary rotary element 5. These pistons 7 are able to tilt or to follow the angular relative displacement of the elements 3, 5.

The legs of each U-Shaped piston 7 engage and bias the opposite radial ends 4 of the primary element 3.

Preferingly, a spring 9 such as a leaf spring, is provided between the piston 7 and the secondary element 5 in order to achieve a biasing. Moreover, in order to modulate the reaction, a fluid under pressure is applied within the chamber 11 provided between the secondary element 5 and the piston 7 through a conduit 8.

A seal 10 achieves the tightness of the assembly.

Preferingly the pressure of the fluid in chamber 11 depends on the provided assistance or on the speed of the vehicle in order to appropriately modulate the reaction, i.e. the feeling at the steering wheel.

Figure 3:
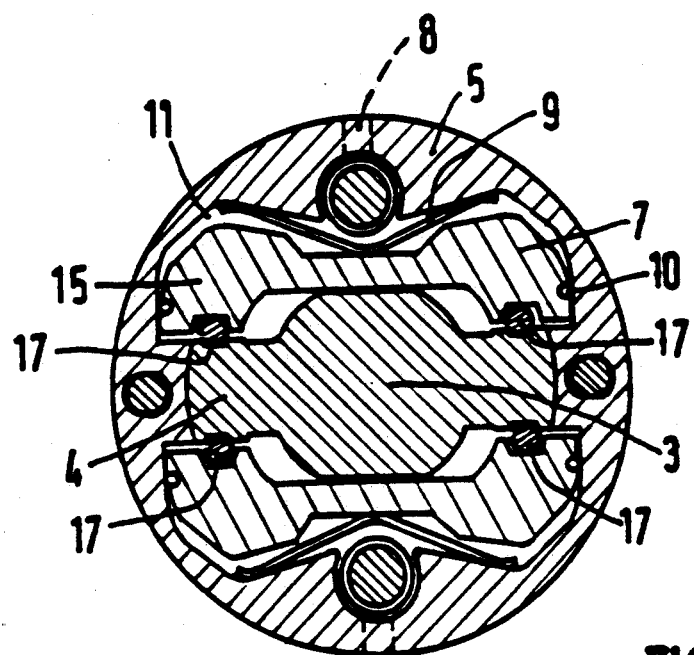
FIG. 3 shows diagrammatically reaction means according to another embodiment of the invention.

FIG. 3 is quite identical to FIGS. 1 and 2, but the legs 15 of the U-Shaped pistons 7 are provided with rolling means 17, such as rollers, in order to enhance the angular relative displacement of the elements.

Figure 4:
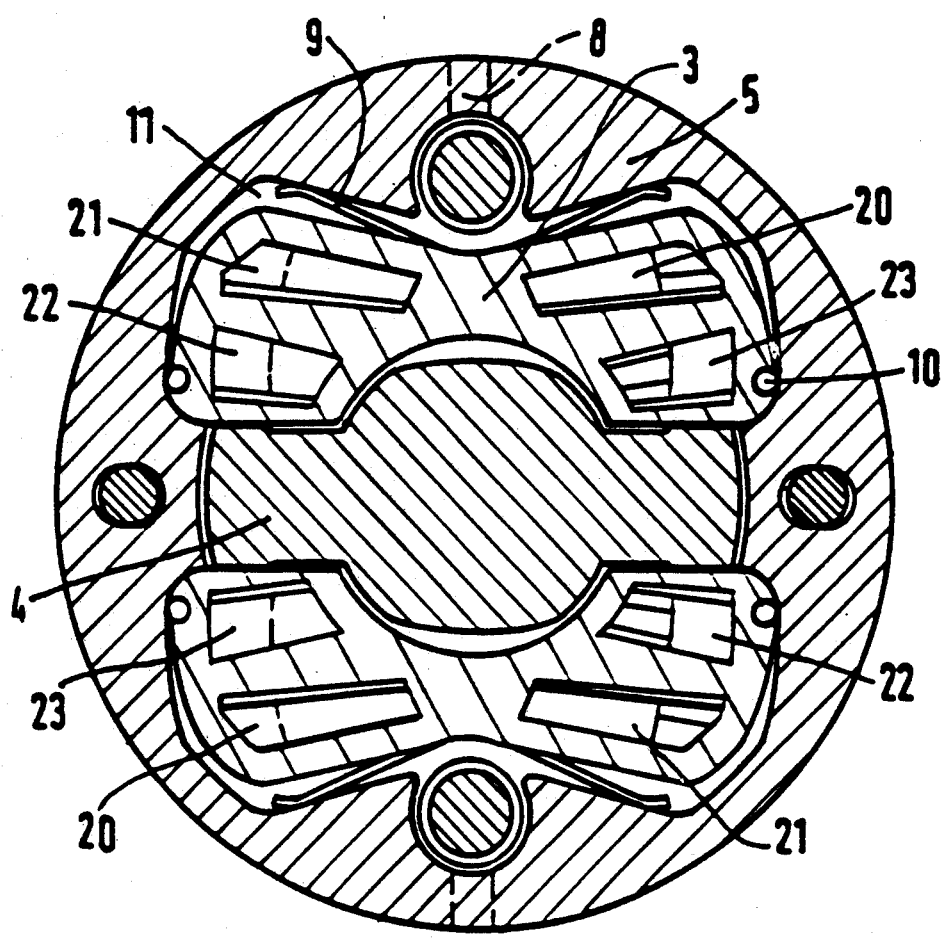
FIGS. 4-6 show an embodiment similar to FIGS. 1 and 2 but where reaction means constitute a valve rotor.
Figure 5:
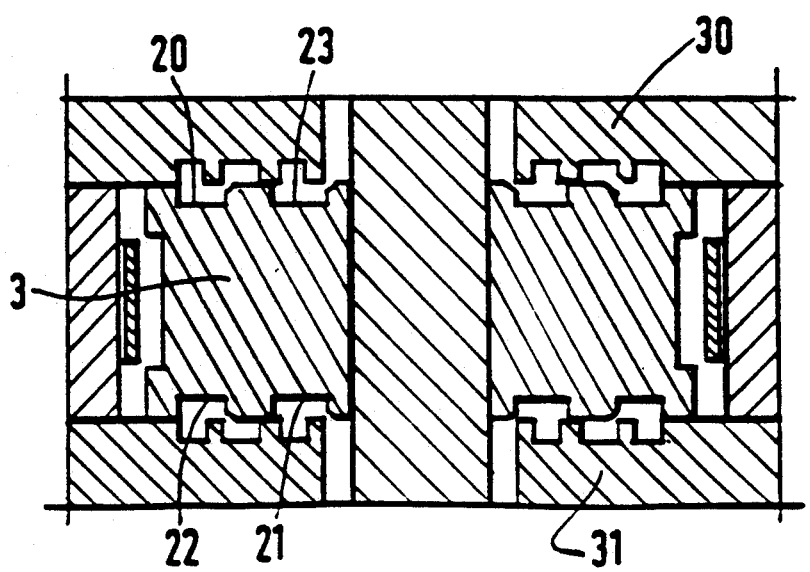
Figure 6:
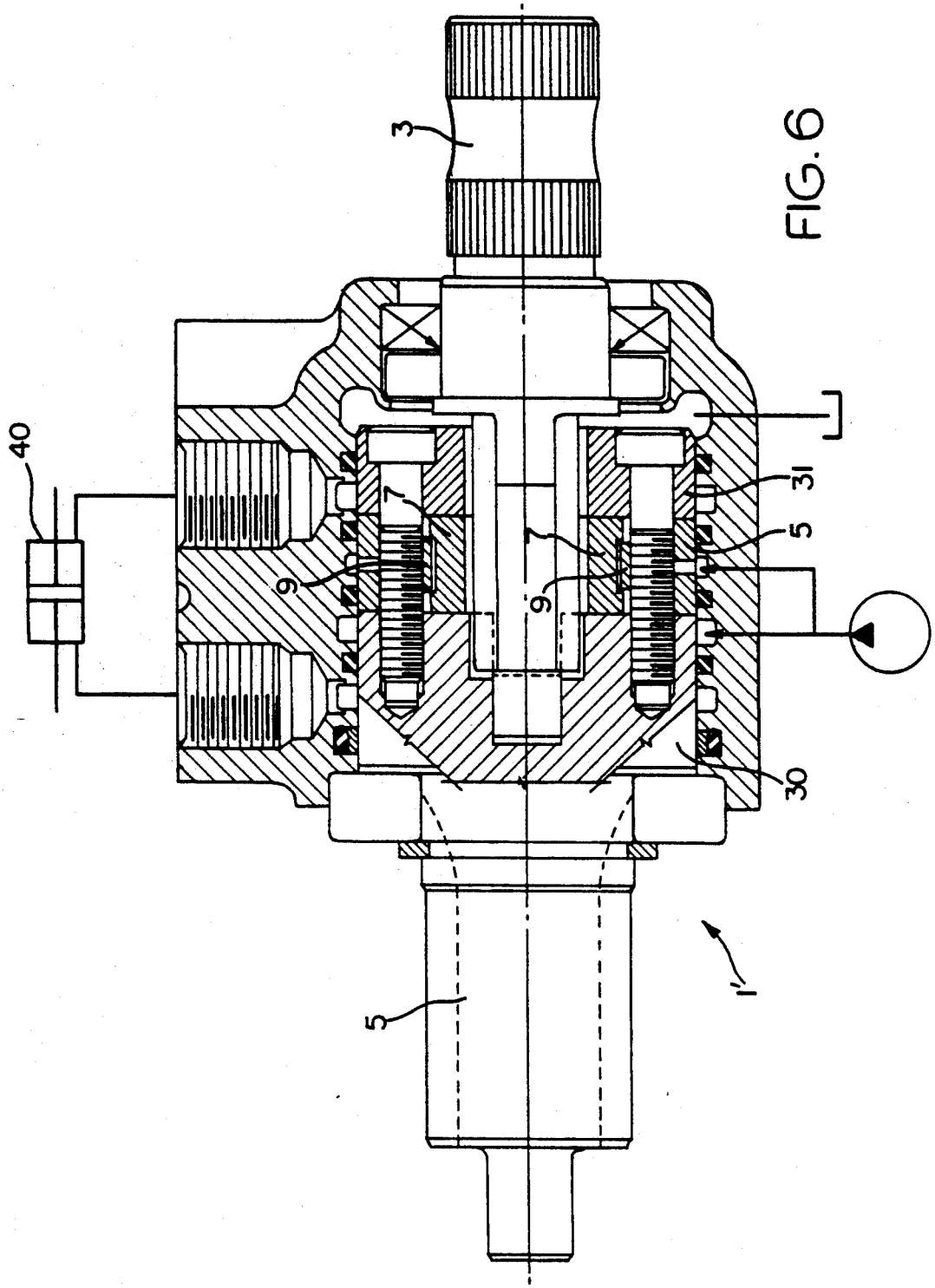

In FIGS. 4-6, which are also quite similar to FIGS. 1 and 2, the U-Shaped pistons 7 are provided with recessed windows 20, 21, 22, 23 having throttling edges in order to constitute the valve rotor itself, when covers 30, 31 close the assembly as shown FIG. 5.

Obviously, while it has been shown and described preferred embodiments of the invention, the man skilled in the art may bring various modifications without departing from the scope of the invention as defined in the appended claims.

I claim:

1. A rotary hydraulic distributor, comprising a primary rotary element having opposite radial ends and coupled to an actuating device and connected for rotation with a valve rotor, a secondary rotary element coupled to a driven device and connected for rotation with a valve stator, the valve stator and the valve rotor cooperating mutually to control a double acting servomotor of the driven device, a limited relative angular displacement permitted between said primary and secondary rotary elements on either side of a central rest position, reaction means provided in order to bias the primary rotary element toward the central rest position, said reaction means comprising a pair of independent substantially U-shaped pistons each able to tilt within respectively one bore of a pair of bores provided symmetrically in said secondary rotary element, elastic means biasing legs of said U-shaped pistons in engagement with the opposite radial ends of said primary rotary element, and recessed windows located within said pistons and having throttling edges so as to constitute said valve rotor.

2. The rotary hydraulic distributor in accordance with claim 1, wherein hydraulic pressure is applied to said pistons in order to bias said radial ends.

3. The rotary hydraulic distributor in accordance with claim 1, wherein the elastic means comprises a leaf spring.